(12) United States Patent
Austin et al.

(10) Patent No.: US 6,364,948 B1
(45) Date of Patent: Apr. 2, 2002

(54) COATING AND DRYING APPARATUS

(75) Inventors: Malcolm Albert Austin, Warsaw (PL); Robert Otto Brandt, Jr., Wilmington, NC (US); Ray Louis Peterson, Chattanooga, TN (US); David Mendel Nathan, Minneapolis, MN (US); Gregg Alan Martell, Lancaster, PA (US); Peter Thomas Kashulines, Jr., Mountain Lakes, NJ (US)

(73) Assignee: Mars, Inc., McLean, VA (US)

( * ) Notice: Subject to any disclaimer, the term of this patent is extended or adjusted under 35 U.S.C. 154(b) by 0 days.

(21) Appl. No.: 09/571,596

(22) Filed: May 15, 2000

Related U.S. Application Data

(60) Provisional application No. 60/191,301, filed on Mar. 21, 2000.

(51) Int. Cl.[7] .............................. B05C 5/00; B05D 7/02; F26B 11/12
(52) U.S. Cl. .............................. 118/58; 118/62; 118/63; 118/303; 34/181
(58) Field of Search .............................. 118/58, DIG. 5, 118/62, 63, 69, 19, 20, 303, 417; 427/372.2, 212, 213; 34/179, 180, 181, 185, 186, 187, 236

(56) References Cited

U.S. PATENT DOCUMENTS

| | | | |
|---|---|---|---|
| 3,197,328 A | 7/1965 | Jung et al. | 117/107.2 |
| 3,612,411 A | * 10/1971 | Oetjen | 241/23 |
| 4,050,406 A | 9/1977 | Reni | 118/19 |
| 4,217,851 A | 8/1980 | Biehl et al. | 118/20 |
| 4,532,155 A | 7/1985 | Golant et al. | 427/213 |
| 4,542,043 A | 9/1985 | Abe et al. | 427/213 |
| 4,581,242 A | 4/1986 | Forster | 427/3 |
| 5,158,804 A | 10/1992 | Alkan et al. | 427/213 |
| 5,296,265 A | 3/1994 | Okuma et al. | 427/213 |
| 5,437,889 A | 8/1995 | Jones | 427/185 |
| 5,507,868 A | 4/1996 | Takei et al. | 118/19 |
| 5,589,225 A | 12/1996 | Yamada et al. | 427/212 |
| 5,721,012 A | * 2/1998 | Long, Jr. et al. | 427/212 |
| 5,792,507 A | 8/1998 | Kato et al. | 427/2.18 |

OTHER PUBLICATIONS

SWECO, "Round Separators", Product Brochure (1997).

* cited by examiner

*Primary Examiner*—Richard Crispino
*Assistant Examiner*—Yewebdar T Tadesse
(74) *Attorney, Agent, or Firm*—Fitzpatrick, Cella, Harper & Scinto

(57) ABSTRACT

An apparatus for heating and/or cooling a plurality of particles including a generally circular bed for holding the particles, the bed having a substantially centered annular inner bed wall, an outer bed wall and an irregular bottom. The apparatus also includes a drive mechanism rotatably affixed to said bed, where rotation of the drive mechanism at a predetermined rate produces a displacement of the bed horizontally and vertically resulting in a particle flow in the x, y and z directions. The particle flow in the x and y planes for a majority of said particles is in a dominant direction. The apparatus also includes an airplant which provides a heated and/or cooled airflow tangentially into the bed in a direction opposite to the dominant direction.

9 Claims, 8 Drawing Sheets

COATING AND DRYING APPARATUS

This application claims the benefit of Provisional Application No. 60/191,301, filed Mar. 21, 2000.

BACKGROUND OF THE INVENTION

1. Field of the Invention

The present invention relates to apparatuses and processes for mixing, coating and drying a plurality of objects. Most preferably, this invention relates to apparatuses and processes for distributing and drying a sugar coating to the surfaces of confectionery.

2. Related Background

Many edible items ("pieces") have an outer coating comprised of sugar and other edible material. Such outer coatings, or candy shells, serve many functions, including preserving the center confectionery, as well as supplying an appealing look and taste to the edible item. Candy shells also give an identified "crunch" when eaten.

Many devices are known for applying a coating to edible pieces. For example, U.S. Pat. No. 5,507,868 discloses a typical prior art sugar coating apparatus. The reference describes a device having a rotary drum panner having a plurality of air holes and hollow shaft portions. Drying gas is supplied through one of the hollow shaft portions and directed downward toward an accumulated layer of particles for drying.

U.S. Pat. No. 4,050,406 discloses a sugar coating apparatus which uses an annular mesh trough for containing objects for coating. The apparatus is mounted on springs and is vibrated to move the objects around the annular container. Drying air is supplied through the center of the apparatus directly to the mesh. The airflow then flows straight through the mesh to exit the top of the apparatus. The airflow is not a tangential flow.

Another prior art device is disclosed in U.S. Pat. No. 5,158,804. This patent discloses a coating apparatus. and process for coating small quantities of tablets (drugs during the initial stages of formulation and development). A spray coating is applied from above the tablets on a mesh and drying air is supplied upwardly from below the mesh. In addition, the mesh is vibrated to make the tablets bounce up and down.

Still other prior art devices fluidize objects for coating. For example, in U.S. Pat. Nos. 5,792,507 and 5,296,265, disclose coating apparatuses and processes which use a rotating disc in conjunction with an air flow at the periphery of the disc near the inner wall of a cylindrical container to fluidize the particles to be coated.

The above apparatuses and processes are insufficient for economically coating a multitude of confectionery since the costs associated with building, operating and maintaining them are relatively high. In addition, the prior art processes require a relatively long period of time to coat confectionery, which results in the expenditure of a greater amount of energy per unit mass of coated material. Further longer coating times reduce productivity of a piece of equipment resulting in higher cost per unit mass of product.

Thus, there is a need for an efficient, compact, and faster apparatus, which consumes less energy than existing apparatuses, and which produces coated confectionery in shorter period of time.

SUMMARY OF THE INVENTION

The present invention addresses the above concerns and presents new and novel apparatuses and processes for coating and drying a plurality of particles. Moreover, the present invention lends itself to any process which benefits from good mixing of particles within a deep bed of product, especially for coating, mixing and drying a hard-panned sugar shell applied to confectionery.

The factory floor area required for the present invention is greatly reduced over existing apparatuses, yielding additional cost savings.

In one aspect of the present invention, an apparatus for heating and/or cooling a plurality of particles includes a generally circular bed for holding the particles, the bed including a substantially centered annular inner bed wall, an outer bed wall and an irregular bottom. The irregular bottom is an uneven surface which may or may not be perforated and most is preferably a screen. The apparatus also includes a drive mechanism rotatably affixed to the bed, where rotation of the drive mechanism at a predetermined rate produces a displacement of the bed horizontally and vertically resulting in a particle flow in the x, y and z directions. The particle flow in the x and y planes for a majority of the particles is in a dominant direction. The apparatus also includes an air plant which provides a heated and/or cooled airflow tangentially below the screen. The airflow moves through the screen, and into the bed of particles.

The air plant may include a pump for providing an airflow into a duct, a dehumidifier in fluid communication with the pump, a heater positioned downstream from the dehumidifier and in-line with the duct, and a generally circular intake manifold having an outer manifold wall and an airflow inlet in fluid communication with the duct and tangentially arranged on the outer manifold wall. The intake manifold is positioned below the bed and includes an outer circumference substantially corresponding to the bed.

An outlet may be included along the outer wall of the bed and be removably covered by a tangentially positioned cover provided around a portion of an inner surface of the outer wall. The cover includes a first end affixed to the inner circumference of the outer wall downstream of the outlet in the dominant direction, and a second movable end adjacent the inner surface of the outer wall when the outlet is closed. The movable end is be positioned upstream from the outlet in the dominant direction and is opened when the movable end is moved toward the center of the bed. The cover and outer wall form a funnel having an entry for accepting particles from the dominant direction.

In another aspect of the present invention, a process for heating or cooling a plurality of particles in an apparatus as described in the previous aspect includes the step of displacing the bed at a predetermined frequency vertically and horizontally to produce a particle flow in the x, y and z directions. Particle flow in the x and y planes for a majority of the particles is in a dominant direction. The process also includes the step of heating and/or cooling an airflow to a predetermined temperature and directing the airflow tangentially to the bed via a generally circular intake manifold substantially corresponding in circumference to the circular bed and positioned below the screen. The airflow flows in a circumferential pattern around the interior of the intake manifold, through the screen and into the bed.

In yet another aspect of the present invention a process for coating and drying a plurality of particles in the apparatus, as described in the first aspect, includes the step of displacing the bed as described in the previous aspect to produce a similar particle flow. Other steps of the process include, in the case of coating particles, applying a coating material from a nozzle positioned above the bed, the application of the coating occurring during a first predetermined period of time, providing a temperature controlled airflow and directing the temperature controlled airflow tangentially to the bed via a generally circular intake manifold which substantially corresponds in circumference to the circular bed and is positioned below the irregular bottom. The airflow being provided after a second period of time has passed after the coating material has been applied. The airflow moves in a circumferential pattern around the interior of the intake manifold, through the irregular bottom and into the bed.

While a preferred embodiment provides the airflow tangentially to the bed in a direction opposite to the dominant mixing direction, air flow in the direction of the dominant mixing direction may also be used.

The high degree of mixing of the individual particles in the x, y and z directions in the present invention ensures consistent treatment of all particles with the desired process. This high mixing reduces piece to piece variation which that results when individual pieces remain in localized areas within the process volume when drying, coating or other conditions differ from the average.

Accordingly, it is a feature of the present invention that a high degree of shear and contact is created between individual pieces of the confectionery product as a result of the particle flow created. This results in faster coating and drying times since confectionery are mixed more thoroughly and evenly and are more uniformly coated, without damaging the confectionery or causing rough surfaced candies.

The tangential air injection into the cylindrical area creates a centrifugal pressure gradient which encourages the majority of the air flow to occur through the outer area of the bed where the majority of the particles are present. This maximizes the desired transfers between the air and the particles.

The present invention optimizes airflow and temperature to maximize evaporation rate. This results in a cycle time for some confectionery which is 20–40% of the time of traditional apparatuses and methods, even with relatively high air humidity dew-points approximately between 4–12° C. By carefully monitoring and controlling the temperature of the product in the bed throughout the coating cycle, a hotter supply of air on average can be used, thereby increasing the amount of moisture that can be removed per cfm.

Thus, it is a further feature of the present invention that the dehumidified and heated airflow provided tangentially to the bed provides maximum evaporative effect to the particles within the bed so that they may be dried faster than other apparatuses and processes disclosed in the prior art.

The speed of coating and drying occur so much faster than in existing techniques, that lower-solids coating solution may be used. High-solids coatings, used in existing techniques, are generally used so that less moisture will be required to be removed from the coated particles after application. High-solids coatings, however, must be kept at heated higher temperatures. Thus, use of lower-solids coating solutions eliminates the need for keeping coatings hot, thereby eliminating the need to heat the coatings and also eliminates the need for water jacketing of piping and containers for ferrying and storing the hot coating. The elimination of hot coating also contributes to significant energy savings due to less heat loss to the environment air.

DETAILED DESCRIPTION OF THE PREFERRED EMBODIMENT

Figure 1:
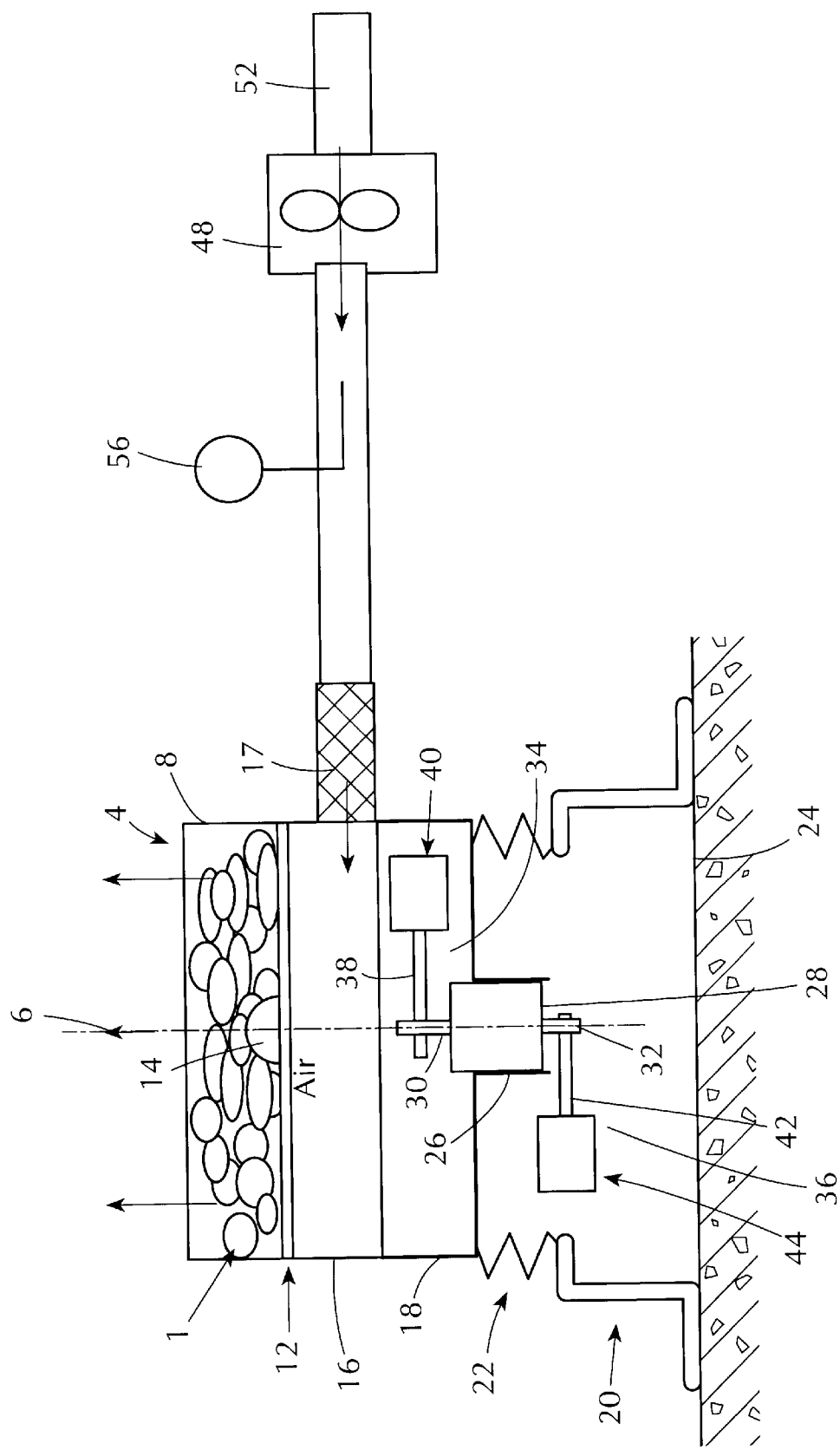
FIG. 1 is a schematic elevational view of the fluid flow system for the coating and drying apparatus according to the present invention.

FIGS. 1–11 illustrate preferred embodiments of the coating and drying system 2 according to the present invention. A cylindrical bed 4 includes a central longitudinal axis 6, a side wall or outer bed wall 8, a bottom 12 formed of an irregular uneven surface, perforated or non-perforated, and a center cone 14. The center cone provides a substantially centered inner bed wall. The irregular bottom surface preferably comprises a mesh screen.

The bed, side wall, cone and irregular bottom may be coated with a non-stick material (e.g. Teflon) to provide low friction so that confectionery particles 1 impacting thereon do not get damaged. Preferably, the screen on the bottom of the bed is a stainless steel market grade wire cloth. The mesh size would depend on the size of particles 1 to be coated.

The bed may be a commercially available separator unit (Sweco, Division of Emerson Electric Co.), which is generally used to separate solids from liquids or segregate dry materials into various particle sizes. The screen comes pre-assembled with the round separators, and is available in a number of mesh sizes.

The bed may be of any depth so that it can contain a deep bed of product. The depth of the bed is between approximately about 2.5 cm–60 cm, and preferably between approximately about 5 cm–30 cm, and most preferably between approximately about 10 cm–15 cm.

The bed, which may include an air intake manifold 16 below the screen 12, is mounted on a motor frame 18. The bed and motor frame assembly, in turn, are mounted on a base 20, via springs 22 secured to the bottom or side of the air intake manifold. Although the apparatus need not be secured to concrete or other structural surface, it is preferred that the apparatus be fastened to a concrete floor 24 by a one or more mechanical or chemical anchors (not shown).

Located approximately at the center of the motor frame 18 is an opening 26 for housing an electric drive motor 28. The motor is substantially centrally aligned with the center axis 6. The motor is provided with shafts 30 and 32 that project to the side from above and below the motor, respectively. A first agitation weight assembly 34 and second agitation weight assembly 36 are mounted on each shaft 30 and 32. When the motor rotates, the assemblies 34 and 36 are spun around by the motor shafts 30 and 32, respectively, and are responsible for vertical and horizontal displacement of the bed during shaft rotation. Both weight assemblies are rotated in the same direction in two different substantially parallel horizontal planes which are also substantially parallel with the bottom of the bed. Thus, the weight assemblies provide an agitating motion horizontally and vertically to the bed.

The first weight assembly 34 includes adjustment bar 38 and horizontal displacement weight 40, and is positioned above the motor to provide centrifugal forces that impart processional motion around the bed in the x and y planes. The second weight assembly 36, adjustment bar 42 and vertical displacement weight 44 impart a spiraling mixing motion in the z plane.

The weight of each assembly may be positioned at different locations along their respective adjustment bar, to achieve a variety of different bed displacements to yield a particular desired flow motion of the product within the bed. Weight 44 is also split to form an adjustable angle there between, and an angle between the adjustment bars of the top weight assembly and the bottom weight assembly, the lead angle, may also be adjusted. Both adjustments yield additional refinements to the bed displacement. Changing the weight positions and angles changes the effective mass and center of gravity of the particular weight assembly, thus changing its associated driving force on the bed, ultimately changing the magnitude and degree of agitation and flow pattern of particles within the bed.

It would be appreciated by one skilled in the art that the important feature of the process being discussed is the motion induced by the motion generator rather than the particular specifics of the mechanism of this example. A wide selection of other mechanical devices exist or could be conceived which can create this required bed motion to produce the desired product motion and mixing in the bed.

The openings in the screen and screen roughness assist in transferring (i.e., coupling) the horizontal screen vibration into product motion. The screen opening size is preferably chosen to be slightly less than the size of the piece being processed.

It will be appreciated by one of ordinary skill in the art, that in the case of mixing product only, that any irregular bottom surface may be used in place of the screen to create the desired particle flow.

It has been observed that larger batch sizes can be coated by using larger diameter beds with more powerful motors driving greater eccentric weights. The consistent factor in obtaining the desired motion of particles is the accelerations in the x, y, and z directions and phase angles previously described. The exact motor size required is determined by a host of factors previously described. Additional factors include but are not limited to desired piece motion, piece size, piece density, piece surface friction properties, and machine size plus mechanical attributes.

The frequency employed will depend on a number of factors including the size of the apparatus. Generally, the larger the unit, the lower the frequency to get the desired motion.

A preferred motion for coating and drying the product is achieved by rotating the weight assemblies at a frequency preferably between approximately 5–100 Hz, preferably at approximately 12–25 Hz, and most preferred at about 15–20 Hz. Since a product's characteristics change during different stages of the process (i.e., coating, mixing and drying), adjustment of the frequency may also be required during a particular stage so that the preferred motion may be maintained.

Generally, the maximum forces of acceleration in the x, y, and z directions will be in a range from about +/−20 to about +/−100 m/sec$^2$, although any accelerations that provide appropriate movement of the particles for coating will be acceptable. The accelerations may be measured using an accelerometer fixed on the outside of the apparatus approximately 15 cm vertically above the screen surface and approximately 45 cm horizontally out from the screen centerline. The maximum accelerations chosen for use in the apparatus will vary depending on the size of the apparatus, and operating conditions, e.g., airflow, product load, particle size and the particle surface friction properties. Generally, the x, y and z direction accelerations are relatively close, e.g., +/− about 10%.

In a preferred embodiment, for coating lentil shaped confectionery, the following accelerations and phase angle yield the preferred motion for the bed:

| X | Y | Z | Lead Angle |
| --- | --- | --- | --- |
| +/−43.3 m/s$^2$ | +/−44.2 m/s$^2$ | +/−43.3 m/s$^2$ | 80° |

The frequency of the vibration of the bed may also be varied at any point during mixing, coating, drying, discharge or any combination thereof, to deliver the optimal motion for a particular point in a particular process. It will also be appreciated that the laws of mechanics allow the vibratory bed to be balanced or unbalanced around its perimeter so that the motion of the bed wall can vary from elliptical to circular in the x, y and z directions at different points around and through the bed. Unbalancing may be controlled in order to impart additional desired mixing and motion of the product.

It will also be appreciated that generally, larger diameter agitation beds require lower rotational frequencies in order to obtain the desired product motion.

Figure 11:
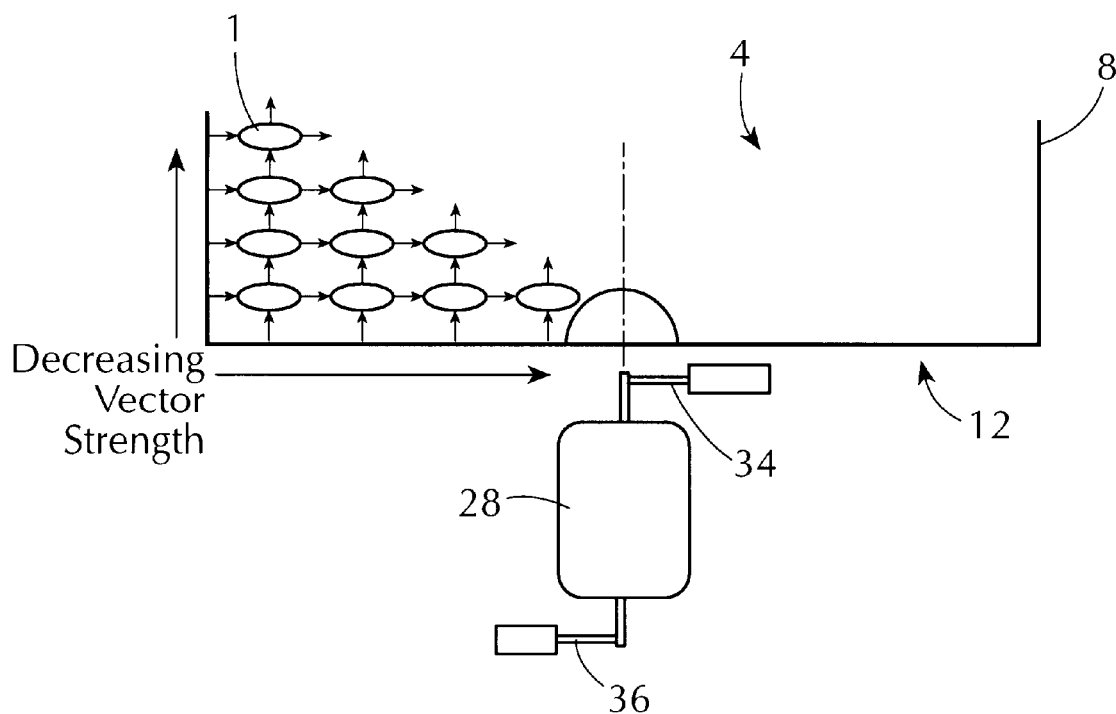
FIG. 11 schematically illustrates the forces applied to confectionery.

During agitation, the walls 8 and screen 12 of the bed impact on the particles causing the particles to impact upon themselves thereby creating a circumferential procession around the bed. The screen in the bottom of the bed also introduces both a displacement torque and a rotational torque around the axes of the individual products, aiding in the flow procession from the bottom of the bed to the top. As shown in FIG. 11, the forces acting on the confectionery particles decrease as one moves up the side wall and toward the center of the bed. Between both flow processions (around and through the bed), confectionery particles are thoroughly intermingled during bed agitation.

Figure 3:
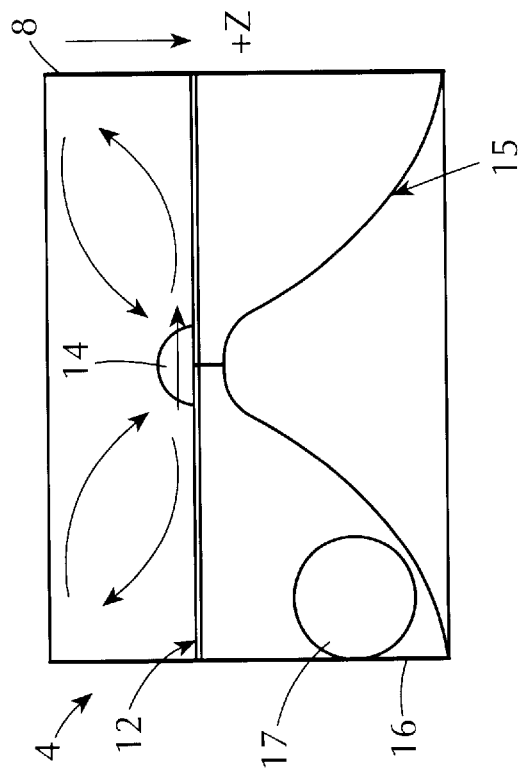
FIG. 3 is a schematic side elevational view of the coating and drying bed according to a first embodiment of the present invention.
Figure 2:
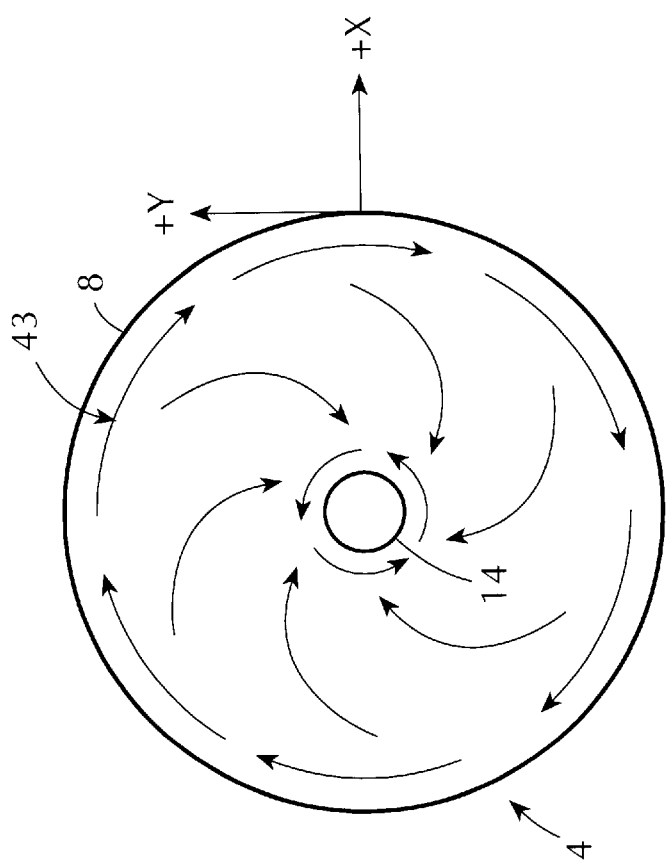
FIG. 2 is a schematic top plan view of the coating and drying bed according to the present invention.
Figure 4:
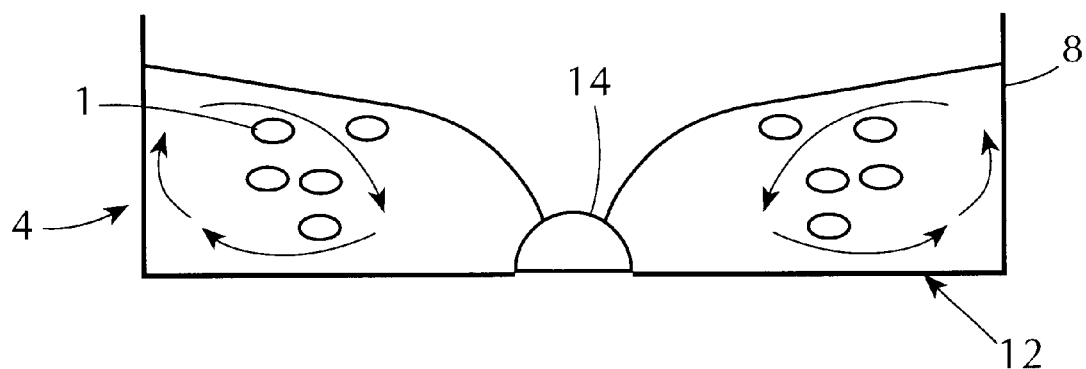
FIG. 4 is a schematic side elevational view of the coating and drying bed according to a second embodiment of the present invention.
Figure 5:
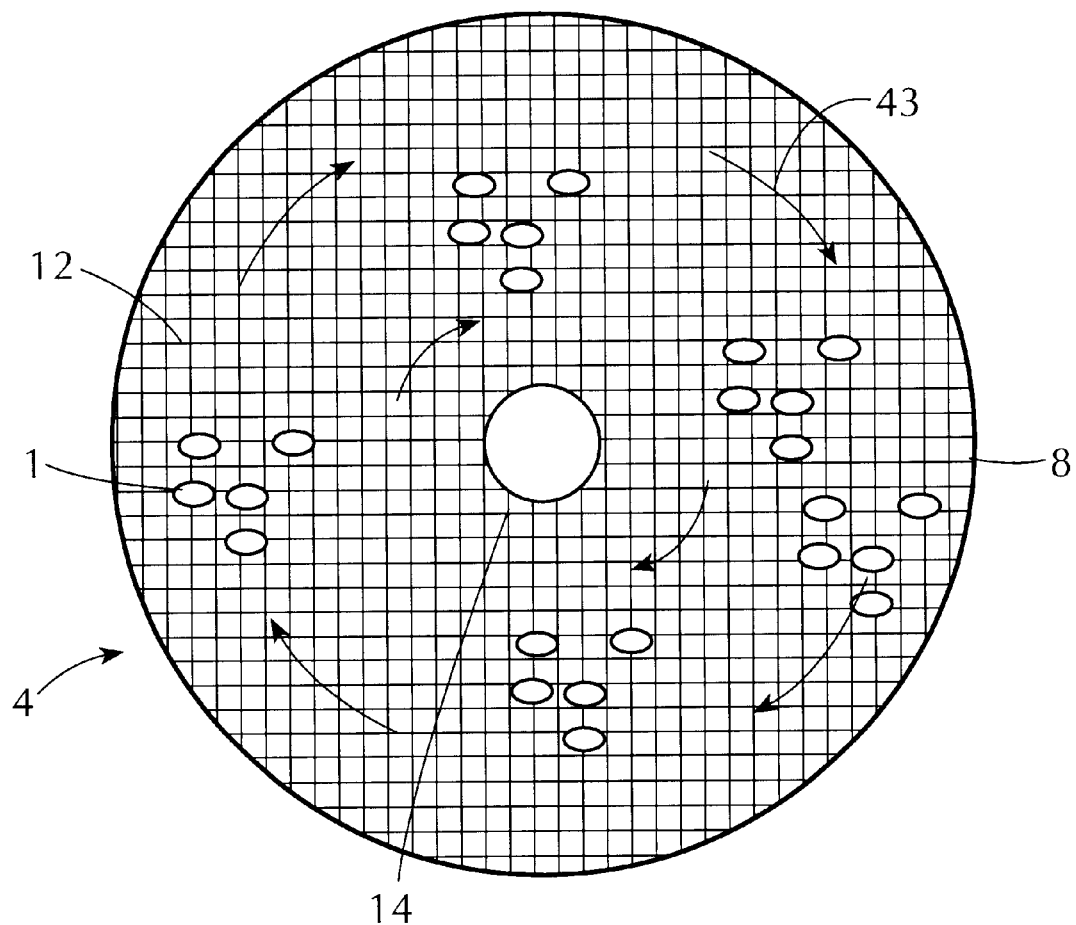
FIG. 5 is a schematic top plan view of the coating and drying bed according to the second embodiment of the present invention.
Figure 6:
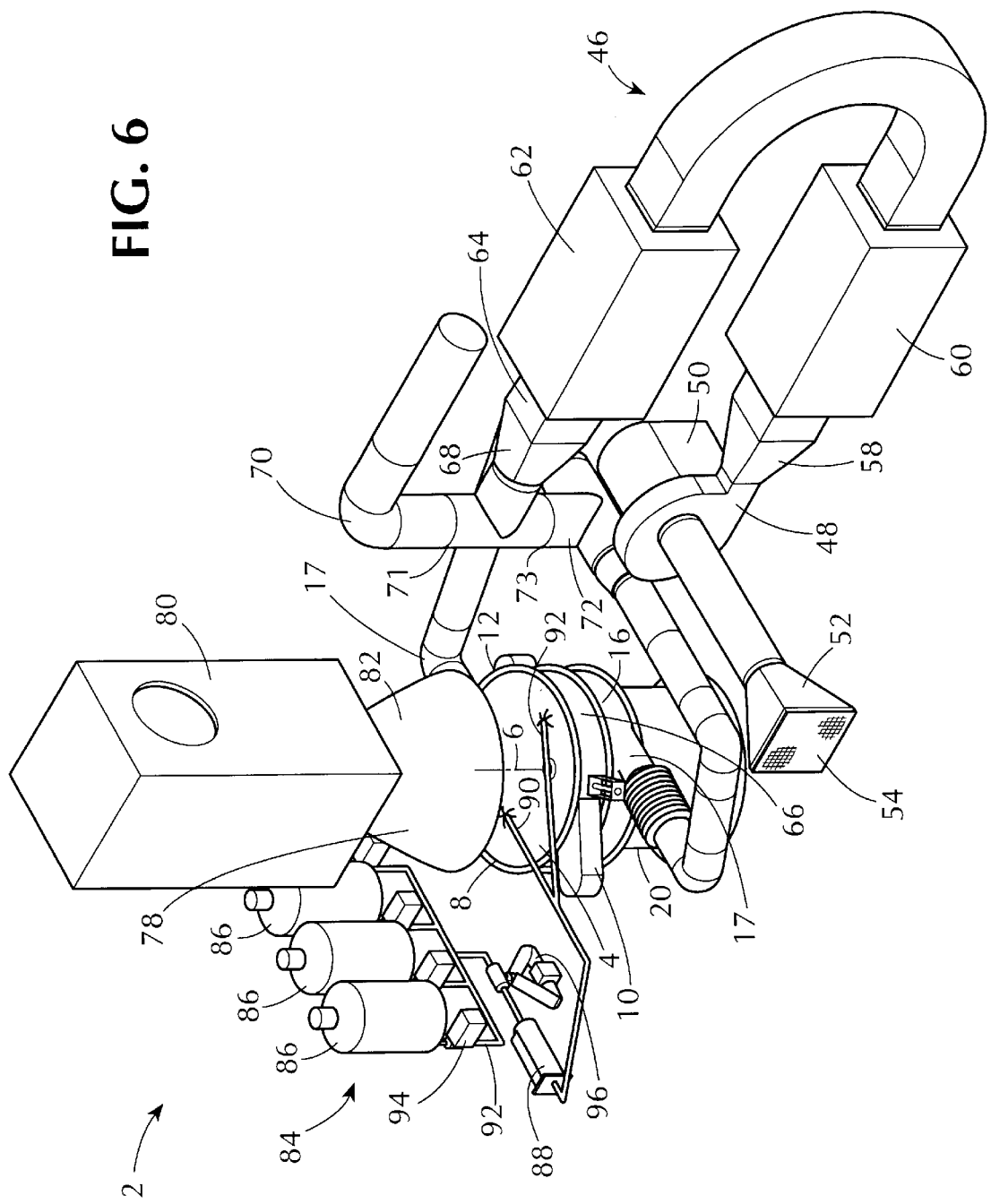
FIG. 6 is a schematic isometric view of a coating apparatus according to the present invention.
Figure 7:
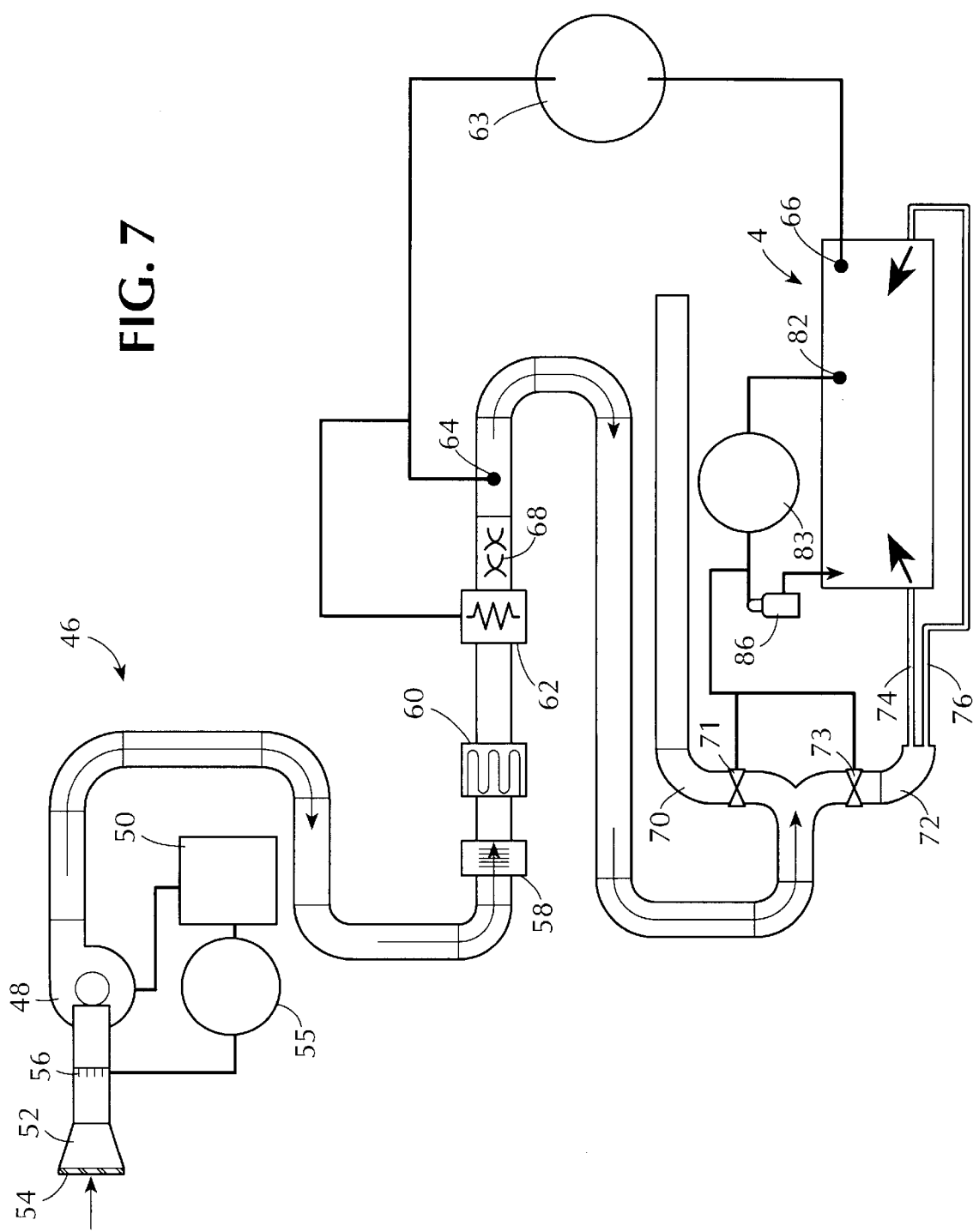
FIG. 7 is a schematic side elevational view of the coating apparatus according to the present invention.

The combined flow processions through the x, y and z planes yield the preferred motion forming a generally torus flow pattern of the particles in the bed. The torus motion, as shown in FIGS. 2 and 3, illustrate a procession of the product around the major axis of the torus, a circulation around the minor axis, and thus a migration around and through the bed. As previously discussed, an additional random motion component is also induced which causes a high rate of migration of individual pieces near each other to move randomly away from one another over time.

Depending upon the direction that the weights assemblies are rotated, the majority of the confectionery particles in the bed is caused to rotate in a dominant flow direction 43 in the x and y planes. The motion is either clockwise or counter-clockwise direction depending upon the spinning direction of the rotating weight assemblies.

Preferably, the individual pieces within the bed traverse around the major axis and the minor axis on average approximately between 1–10 times/minute, and more preferably between 3–10 times/minute. The higher values are obtained when the particles are dry. The induced motion causes the confectionery pieces positioned at or near the top of the bed to flow in the dominant flow direction, spiraling toward the center of the bed. As the particles approach the edge of center cone 14, they begin rotating in a direction opposite to the dominant flow direction and are then dragged under in the negative z direction. Once they are pulled down in the center of the bed, the particles proceed up and out from the bottom of the bed as they move toward the outer wall. The center cone is used to prevent particles from entering the very center of the bed, which is an area having little mixing flow. While a center cone is preferred, the substantially centered inner wall is not limited to a cone shape and may take any form, e.g., a cylinder, that serves to prevent particles from entering the center of the bed.

The size of the individual confectionery particles also determines how fast the confectionery particles are carried in the torus mixing procession. Specifically, the smaller the confectionery, the faster the motion. Thus, smaller confectionery pieces are more thoroughly mixed for a given time period.

Airflow to dry the particles that have been freshly coated is supplied from an airflow system 46 is provided to the bed at tangential air induction inlets 17, which preferably may be positioned on the intake manifold 16 located below the bed, or at the base of the wall 8 of the bed. The inlets are positioned on either side of the bed separated by approximately 180 degrees. The airflow enters the bed preferably from below the screened bottom, in the case that the airflow is provided through the intake manifold, in a swirling pattern around the circumference of the bed 4 to dry confectionery that have been freshly coated. However, the swirling airflow may also be directed tangentially from the base of the walls of the bed.

The airflow system 46 provides air which can be conditioned and delivered at a range of dew-points, temperatures and flow rates. The system is preferably an open loop system which feeds air at predetermined flow rates through the bed via the tangential air intakes. The system includes a centrifuge blower 48 powered by a variable speed electric drive motor 50. An air intake 52, provided with a filter 54, for removing dust particles and the like, feeds fresh or recycled air into the center of the blower, which compresses and propels the air out tangentially at an adjustable controlled flow rate.

The flowrate of the airflow system is controlled by a dedicated single loop controller 55, which receives flow rate information from a flow sensor 56, positioned within the intake portion of the system. Based on the flow sensor output, the controller adjusts the speed of the variable drive motor powering the blower. Flowrate in the present invention is controllable from 0 CFM to 400 CFM, and preferably between 180–350 CFM.

The airflow is initially sent to a diffuser element 58 to diffuse the air into a wider path for entry into a humidity controlling unit 60. The humidity unit 60 dehumidifies the entrained airflow, and also lowers the temperature of the airflow since compression of the air by the blower causes the airflow to increase slightly in temperature. A cooler or air-conditioner may also be used in addition to or in place of the humidity controlling unit.

Preferably, the humidity unit 60 is a multiple tube chilled water cooler having chilled water at a temperature of approximately about 1–10° C., and preferably between 4–6° C. As the airflow passes over the tubes, moisture condenses on the tubes and the temperature of the air is lowered. The dew point of the air flow is reduced to approximately about 0–10° C., and preferably reduced to approximately 5° C. It is preferred that the humidity unit 60 include a large number of coils to ensure that the air temperature becomes equilibrated close to the water circuit temperature, and thus the water temperature determines the air dew-point.

From the cooling unit, the airflow is directed to a heater 62 which heats the air to a preferred temperature for removing moisture from the coating bed 4 for the particular type of confectionery and coating used. A second controller unit 63 controls the temperature of the airflow by controlling the amount of heat added to the airflow by the heater 62. A temperature sensor 64, positioned immediately after the heater, and a temperature sensor 66 positioned within the bed adjacent the particles provide input to the temperature controlling unit. The temperature sensors may be infrared sensors, or any other temperature sensor familiar to one of ordinary skill in the art. Based on the temperature at these two locations, the temperature of the airflow is carefully adjusted so that evaporative cooling is maximized. Airflow temperatures are controllable from 5–60° C.

Preferably, the airflow is heated to a temperature between approximately about 21–50° C., so that the bed temperature is kept approximately between 20–26° C., and preferably at a temperature between 21–25° C., and most preferably at a steady-state temperature of 22–24° C. The present invention is capable of heating the airflow at a rate of approximately about 1–2° C./second. To quickly dry coated product, the temperature of the bed is maintained as high as possible without damaging the particles in order to maximize the difference in humidity between the airflow and the coating surface to maximize the drying rate. This temperature, however, is below a temperature at which the coating or the confectionery itself are harmed. Once the airflow is heated, it exits the heater and enters a mixing element 68 which insures that the airflow is even in temperature.

As one of ordinary skill in the art will appreciate, the present invention may apply a wide range of temperatures and dew-points to effectively, heat, cool, and dry product in the bed.

The airflow is split into two streams after the heater—one being an exhaust stream 70 and one being a bed stream 72. Each includes a valve 71 and 73, respectively, to control the amount of airflow each stream receives. The exhaust stream 70 is used to exhaust the airflow (bypass) from the bed once the coated confectionery have dried, or when coating material is being applied. The airflow is exhausted by closing valve 73 on the bed stream 72, and opening the valve 71 on the exhaust stream 70. The bed stream is further split into two more streams, 74 and 76, each directed to one each of the tangential air intakes 17 on the intake manifold.

In a preferred embodiment, as the airflow passes through the screen and into the particles in the bed 4, the airflow encounters a pressure drop of approximately about 0.5 inches water column (125 Pa). However, it is worth noting that the pressure drop through the bed of particles is dependent upon the confectionery size. The smaller the confectionery, the higher the pressure drop. Moreover, pressure drop in the present invention is also dependent upon bed agitation, with an agitated bed having approximately about 33% less pressure drop than a bed of stagnant product.

With the exception of the reduced pressure drop resulting from bed agitation, the air pressure drop through the bed of product can be closely modeled with conventional accepted equations governing air flow through beds of particles.

A shroud 78 which is part of the dust collection device (DCD), covers the bed during operation and channels the airflow blown through the bed into ambient air, via a filtration element 80. The filtered air may be directed to the air intake of the system. The shroud includes a humidity probe 82 which is placed in the exhausted airflow connected to a controller 83 for controlling the airflow stream directions and coating systems.

It has been determined that the humidity level of the air which has been passed through the product corresponds substantially to that of the equilibrium relative humidity of the product within the bed. Thus, when the humidity of the air reaches a predetermined value, the coated product is dry. It will be appreciated by one of ordinary skill in the art that to obtain the most accurate humidity level of the product, and thus, determine when a drying cycle is complete, that substantially all the air which passes through the product bed is preferably captured by the shroud.

Upon the exhaust airflow reaching a predetermined dewpoint, indicating that the product is dry, the drying airflow bypasses the bed and another coating layer may be added, or the confectionery may be removed from the bed. Depending upon the particular confectionery, the drying is completed when the air dew point has reached approximately 10 to 15 C., depending on the particular shot layer being applied.

A coating system 84 dispenses coating material into the bed 4 and also monitors and controls the airflow to the bed. The system includes one or more storage containers 86 which are connected to a pump 88 via a pipeline 92. The pump 88 draws coating material from the containers to spray onto the confectionery from above via two nozzles 90 and 92 positioned on either side of bed 4. Electrical or mechanical valves 94 control which container(s) material is used for dispensing, with one or several of the containers being selected at a time for dispensing material. The flow of the material from the storage containers is monitored by a metering device 96, which determines the exact amount of material sprayed onto the edible pieces.

Any confectionery coating may be applied in the present invention including liquid and powder materials, sugar syrups, and flavored fats including cocoa butter and oils. For the present invention, process speed is not significantly slowed by lower concentration coating, i.e., a higher moisture content solution. It has been determined that for sucrose based solutions, the preferred concentration is approximately about between 50 and 70 Brix, and more preferably between 60 and 70 Brix. It has been found that the most preferred concentration is 65 Brix which maximizes drying rates while avoiding sugar crystallization issues generally associated with higher solids syrups.

Prior to applying the coating material and shortly thereafter, however, the airflow is substantially directed away from the bed by completely diverting the airflow to the exhaust stream. This is preferred so that a minimum amount of coating material is entrained into the airflow and that the coating material applied to the confectionery is maximized. Bypassing the drying air flow away from the bed is also advantageous because it gives time for the liquid to be evenly distributed around the pieces.

After the coating has been applied, the coating pump is shut off and the valves to the storage containers are closed preventing any further coating material from entering the bed. During coating operations, the bed is continuously agitated to ensure even and equal distribution of the coating material over all surfaces of the product. Any coating particles which do not adhere to the product fall through the screen to be collected at a later time.

It will be appreciated to one of ordinary skill in the art, that as the airflow in the present invention passes through the bed, it is of relatively low velocity, so that coating material is not carried away in the airflow stream. For a preferred embodiment, this velocity is approximately between 0.10–2 m/s, and more preferred at 0.25–0.5 m/s, and most preferred when the velocity is approximately 0.35 m/s. This preferred airflow may vary depending on the product being processed.

By directing the airflow away from the bed during the application of the coating and shortly thereafter (while the coating is distributed over the surfaces of the particles) the system ensures that coating material does not end up wasted and trapped in the filtering system. This keeps costs down since the filters of the system need not be replaced as often, and use of the coating material is maximized.

The process of applying or varying the coatings may be repeated as many times as required to build the desired coat thickness with confectioneries receiving at least one or more coats.

After the coating material has been distributed to the surfaces of the particles, the control valves on the airflow streams are adjusted to direct the majority of the airflow to the bed to initiate the drying process. It is preferred that during the drying operation, at least approximately 80–100% of the airflow be directed to the bed, and more preferably 85–100%, and most preferably 90–95%. The lost air represents undesirable leakage which occurs in the system.

Figure 9:
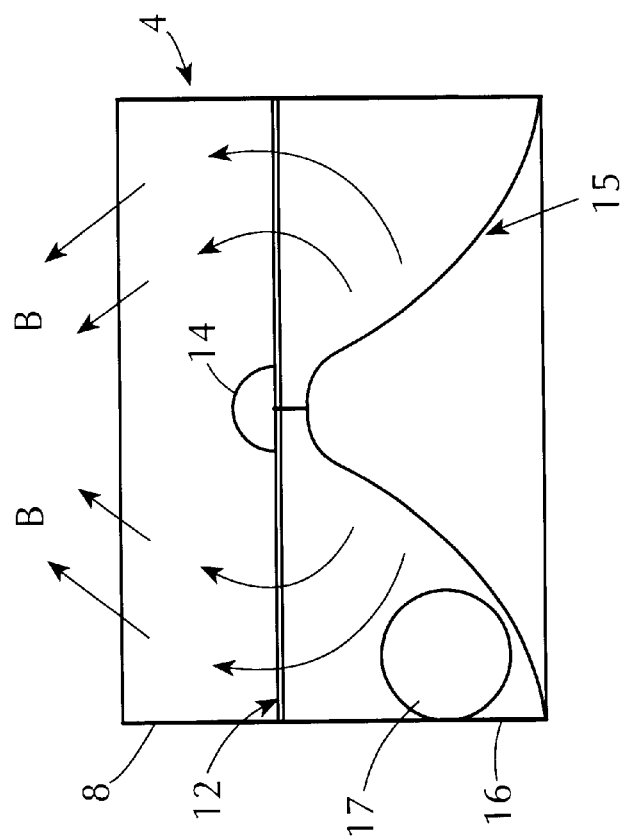
FIG. 9 is a schematic side elevational view of the fluid flow within the coating and drying bed according to the present invention.
Figure 8:
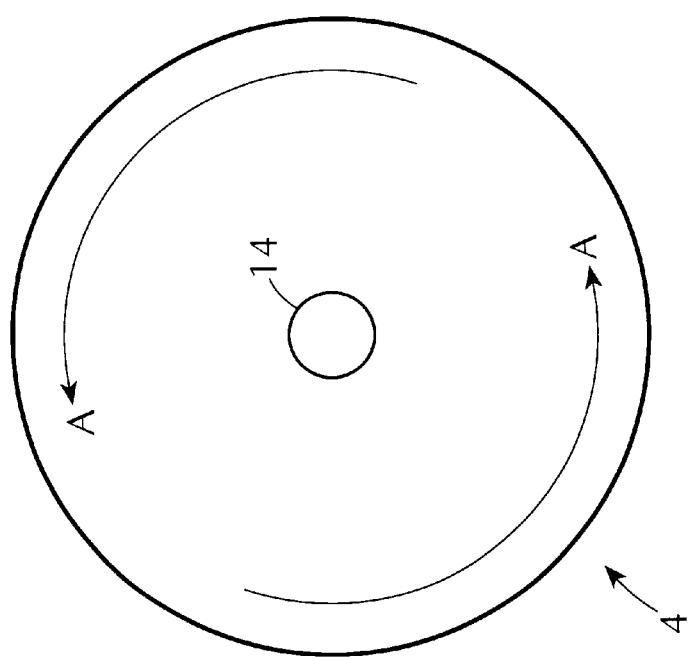
FIG. 8 is a schematic top plan view of the fluid flow within the mixing and coating bed according to the present invention.

The airflow, as previously described above, is preferably tangentially introduced under the bed in a direction opposite to that of the dominant mixing direction (see FIG. 8) to better interact with the confectionery. As shown in FIG. 9, it is preferred that the airflow enter the thickest portion of the bed containing the confectionery to counter the general flow of the confectionery to maximize the removal of humidity from the bed. Preferably, a contoured center 15 is placed in the intake manifold area, to assist in directly the air flow to the regions of the bed containing the thickest portion of particles, as well as encouraging the airflow towards the outer wall by designs which aid the centrifugal effect. The direction of the airflow around (A) and through the bed (B) is shown in FIGS. 8 and 9, respectively. One skilled in the art will appreciate that for processing small pieces it may be desirable to induce the air in the same direction as the dominant mixing direction in order to assist the motion around the bed and aid subsequent product discharge from the pan at the end of the cycle.

Figure 12:
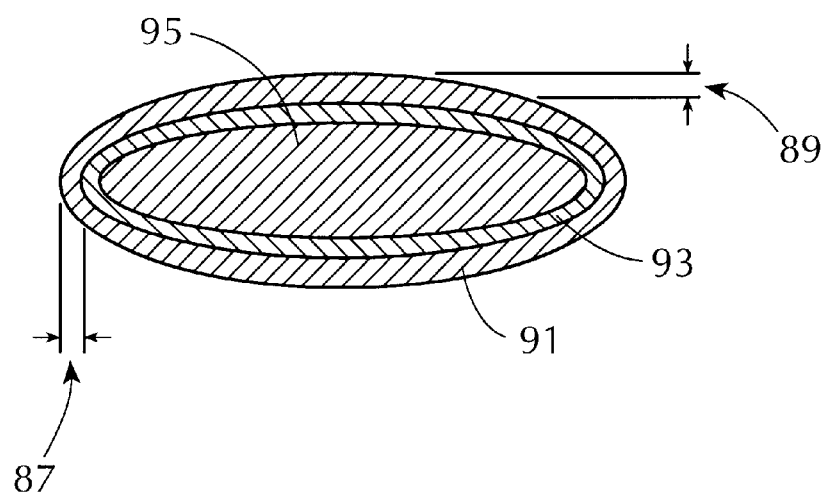
FIG. 12 is a side-sectional view of a coated confectionery.

For ellipsoid shaped coated product, the present invention produces a dried coating thickness substantially equal at the circumference of the major axis to that at the apogee of the minor axis. Specifically, as shown in FIG. 12, it is preferred that the ratio of the thickness between the major axis 87 and minor axis 89 of a coating shell 91 applied after a first coat 93 on a particle center 95 is approximately between 0.9:1–1.1:1, and most preferably about 1:1.

Figure 10:
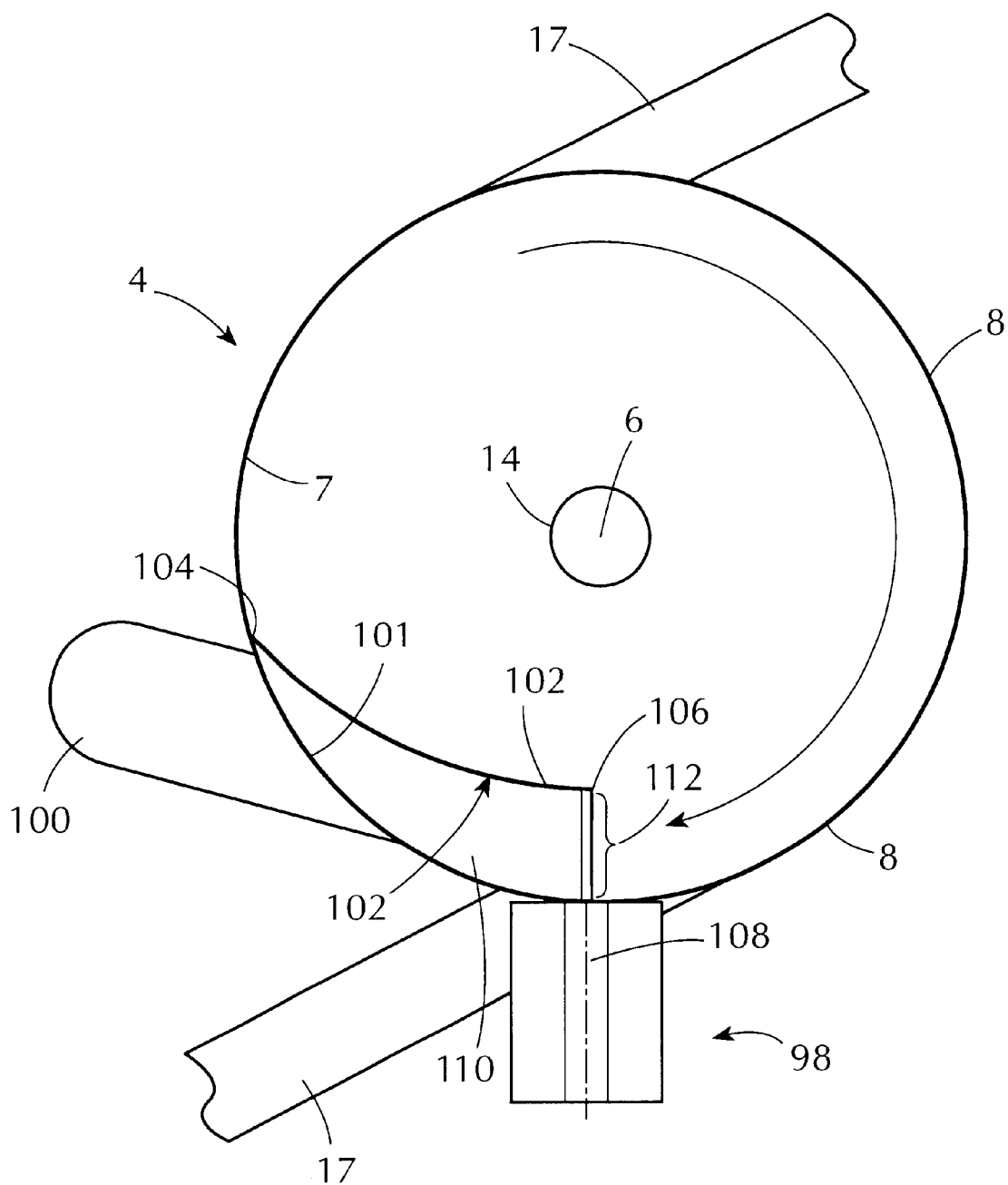
FIG. 10 is a schematic top plan view of the coating and drying bed according to the present invention.

Once the confectionery have been coated and completely dried, the airflow is either shut down or directed away from the agitation bed so that another coating may be applied, or so that finished confectionery may leave the bed. To remove the confectionery from the bed, a novel discharge mechanism 98 having a discharge chute 100 has been designed for the present invention and is described as follows. Along the outer wall 8 of the bed, an opening 101 is provided large enough to quickly remove a stream of the confectionery from the dominant flow direction in a short period of time. During coating and drying operations, the outlet is covered by a tangential cover 102 positioned along the inner surface 7 of the bed wall 8. One end 104 of the tangential cover is affixed to the inner surface 7 on one side of the outlet, while the other end 106 of the tangential cover may be moved. The movable end 106 is attached to a solenoid 108 which, upon activation, moves the movable end 106 from the inner surface 7 of the bed wall 8, towards the center of the bed. This is shown in FIG. 10 of the present invention.

The distance created between the tangential cover 102 and the inner surface 7 of the outer wall 8 creates a funnel portion 110 having an inlet 112 for accepting confectionery particles moving in the dominant flow direction. In FIG. 10, this is shown as the clockwise direction. The newly created funnel portion 110 quickly allows the confectionery to be removed from the agitation bed 4 without the need to stop the agitation mechanism, and without the need for worker intervention.

The discharge mechanism 98 may also be used as an entrance for placing yet to be coated confectionery into the bed. By reversing the dominant flow direction (reversing the rotation of the weight assemblies), a predetermined amount of confectionery may be added into the bed via the outlet. As the confectionery enter the bed, the pieces rotate in a direction opposite to the funnel direction (opposite the dominant flow direction) so that confectionery may be led away from the opening and into the bed. Once the predetermined amount of confectionery is received, the tangential cover is returned to the position adjacent the outer wall. At that time, the rotation of the weight assemblies is reversed to allow the confectionery to flow in the dominant flow direction once again for coating and drying.

The above stated process for heating, cooling, coating, and/or drying particles of confectionery is best illustrated and summarized with the following examples. The apparatus used for all examples includes the following: Bed Diameter: 76 cm. Sweco, Inc., Florence, Ky. 41022-1509, Model LS30 agitator driven by a ½ HP, 1150 RPM (19.2 Hz rotation frequency) motor @ 60 Hz electrical supply frequency. Additional weight equal to approximately 50% more than the maximum standard weight setting was added to the bottom weight assembly in order to achieve the desired vertical mixing motion of the bed.

EXAMPLE 1

Product: M&M Plain Chocolate Candies.

30 kg of uncoated product were placed in the coating bed. The density of the individual pieces were 1.28 grams/cubic centimeter. The uncoated M&M chocolate centers were ellipsoidal in shape with dimensions 13 +/−0.5 mm diameter and 6.2+/−0.5 mm in thickness. The coating was applied to the particles using upwards of 50 individual syrup shots in the following process.

Particles were equilibrated to a start temperature of approximately 23° C. by passing controlled temperature and humidity air up through the agitated particles.

When the product temperature set point was achieved, the majority of the air was then diverted from the bed. A small percentage of the air volume approximately 5% is allowed to continue to pass through the bed in order to maintain instrumentation function, and maintain control of certain variables, e.g., the temperature and humidity of the airflow.

A sugar syrup shot of volume approximately 200 grams was added to the candy over a time of approximately 20 seconds.

The candy was mixed an additional 20 seconds (approximately) to evenly distribute the syrup over all the candy pieces prior to introducing the drying airflow.

The drying air was then introduced into the product.

The temperature of the drying air was modulated to maintain the bed at a preferred temperature of approximately 23° C. When air was first introduced into the bed, the air temperature was increased to nearly 60° C., in order to maintain the bed temperature of the set point of 23° C. This was the result of the cooling effect of the rapidly evaporating moisture. The temperature of the air flow into the bed decreased to near 23° C. during the later part of the drying due to the much lower rate of moisture evaporation (i.e., lower evaporative cooling effect). When the particles were almost completely dried.

When the dew point of the air emerging from the bed of product reached the set point for that particular application of syrup, e.g., between approximately 10–15° C., the process was repeated by returning to step 2 until the required number of syrup shots was applied.

EXAMPLE 2

Product: Cocoa Butter Fat Coated M&M Mini Plain

Chocolate candies. Approximately five percent cocoa butter was applied using about 10 individual applications of cocoa butter with the following process.

20 kg of pieces were equilibrated to the desired start temperature of 18° C. by passing controlled temperature and 4° C. dew-point air up through the agitated pieces. The vibration settings were substantially similar to that for the sugar shell process previously described. The air volumes were also substantially similar to that for sugar coating.

When the product temperature set point was achieved, the majority of the air was diverted from the bed.

A cocoa butter shot having a temperature of about 40° C. and a mass of approximately 100 grams was added to the candy over a time of approximately 20 seconds.

The candy was mixed approximately 20 seconds after the end of the cocoa butter shot to evenly distribute the cocoa butter over all the candy pieces.

Cooling air was introduced into the product.

The temperature of the cooling air was modulated to maintain the bed at the preferred temperature of about 18° C. When air was first introduced into the bed, the air temperature approaches 6° C. in order to keep the bed from heating above the set point of 18° C. due to the heating effect of the rapidly crystallizing cocoa butter. The air temperature was increased to near 18° C. during the later part of the cooling due to the much lower rate of fat crystallization heat evolution.

When the temperature of the air emerging from the bed of product reached the set point for that particular shot, and/or the set amount of crystallization time was achieved, the process was repeated by returning to step 2 until the required number of shots were applied.

EXAMPLE 3

Product: Skittles Bite Size Candies

An edible adhesive was firstly applied followed by the addition of an edible powder which adheres to the adhesive. The formulation of the components was such that no air addition was needed to heat, cool or dry the product.

20 kg of pieces were added to the vibrating bed. The vibration settings were very similar to that for the sugar shell coating process previously described in Example 1.

100 grams of glue material at a temperature of approximately 50° C. was added to the Skittles over a time period lasting approximately 60 seconds. The formulation of the edible glue was approximately ~25% edible dextrin starches, ~38% sucrose, and 37% water.

The candy was mixed another 60 seconds to evenly distribute the glue over all the candy pieces.

Approximately 1 kg of a substantially equal mixture of 180 micron granular sucrose and 300 micron citric acid was added to the candy over a time period lasting about 90 seconds.

The candy was immediately discharged from the bed, requiring approximately 60 seconds to empty the pan.

It will be appreciated by one of ordinary skill in the art, that the above described processes, apparatuses, and examples could be applied to: (i) using a chocolate coating or other matrix to coat particles including adhesives and powder and edible and non-edible coatings; and (ii) heating, cooling, drying, coating or any combination thereof, any material, edible and non-edible.

Other variations and modifications of this invention will be apparent to those skilled in this art after careful study of this application. This invention is not to be limited except as set forth in the following claims.

What is claimed is:

1. An apparatus for heating and/or cooling a plurality of particles, said apparatus comprising:
    a) a generally circular bed for holding said particles, said bed having a substantially centered annular inner bed wall, an outer bed wall and an irregular bottom;
    b) a drive mechanism rotatably affixed to said bed, wherein rotation of said drive mechanism at a predetermined rate produces a displacement of said bed horizontally and vertically resulting in a particle flow in the x, y and z directions, and wherein said particle flow in the x and y planes for a majority of said particles is in a dominant direction; and
    c) an airplant providing a heated and/or cooled airflow tangentially into said bed.

2. The apparatus according to claim 1, wherein said airplant provides said heated and/or cooled airflow tangentially to said bed in a direction opposite to said dominant direction.

3. The apparatus according to claim 1, wherein said irregular bottom is a screen and wherein said airplant comprises:
    a) a pump for providing an airflow into a duct;
    b) a dehumidifier in fluid communication with said pump;
    c) a heater positioned downstream from said dehumidifier and in-line with said duct; and
    d) a generally circular intake manifold having an outer manifold wall and an airflow inlet in fluid communication with said duct and tangentially arranged on said outer manifold wall, said intake manifold positioned below said bed and having an outer circumference substantially corresponding to said bed.

4. The apparatus according to claim 1, further comprising a shroud sealably affixed to the top of said bed, said shroud having an outlet to exhaust the airflow from said bed.

5. The apparatus according to claim 1, further comprising an outlet positioned along said outer wall of said bed, said outlet being removably covered by a tangentially positioned cover provided around a portion of an inner surface of said outer wall, said cover having a first end affixed to said inner circumference of said outer wall downstream of said outlet in said dominant direction, and a second movable end adjacent said inner surface of said outer wall when said outlet is closed, said movable end positioned upstream from said outlet in said dominant direction and said outlet being opened when said movable end is moved toward the center of said bed, wherein said cover and said outer wall form a funnel having an entry for accepting particulate from said dominant direction.

6. An apparatus for coating and drying a plurality of particles, comprising:
    a) a generally circular bed having a substantially centered annular inner bed wall, an outer bed wall and a screened bottom;
    b) a nozzle positioned adjacent said bed;
    c) a drive mechanism rotatably affixed to said bed, wherein rotation of said drive shaft produces a displacement of said bed horizontally and vertically resulting in a particle flow in the x, y and z directions, and wherein said particle flow in the x and y planes for a majority of said particles is in a dominant direction; and
    d) an airplant providing a temperature controlled airflow tangentially below said screen, said airflow flowing through said screen and into said bed to dry said particles.

7. The apparatus according to claim 6, wherein said airflow is provided tangentially to said bed in a direction opposite to said dominant direction.

8. The apparatus for drying a plurality of particles according to claim 7, wherein said airplant comprises:
    a) a pump for providing an airflow into a duct;
    b) a dehumidifier in fluid communication with said pump;
    c) a heater positioned downstream from said dehumidifier and in-line with said duct, wherein said airflow is heated to a drying temperature for drying said particles in said bed; and
    d) a generally circular intake manifold having an outer manifold wall and an airflow inlet in fluid communication with said duct and tangentially arranged on said outer manifold wall, said intake manifold positioned below said bed and having an outer circumference substantially corresponding to said bed.

9. The apparatus according to claim 7, wherein said intake manifold includes a contoured center to urge said airflow through an outer portion of said bed.

* * * * *

UNITED STATES PATENT AND TRADEMARK OFFICE
CERTIFICATE OF CORRECTION

PATENT NO.    : 6,364,948 B1
DATED         : April 2, 2002
INVENTOR(S)   : Malcolm Albert Austin et al.

It is certified that error appears in the above-identified patent and that said Letters Patent is hereby corrected as shown below:

Column 1,
Line 38, "apparatus." should read -- apparatus --;
Line 46, "in" should be deleted; and
Line 63, "shorter" should read -- a shorter --.

Column 2,
Line 15, "most is" should read -- is most --.

Column 3,
Line 18, "which" should be deleted.

Column 6,
Line 61, "illustrate" should read -- illustrates --.

Column 7,
Line 33, "is provided" should read -- and is provided --.

Column 10,
Line 43, "in directly" should read -- in directing --.

Signed and Sealed this

Eighth Day of July, 2003

JAMES E. ROGAN
*Director of the United States Patent and Trademark Office*